(12) United States Patent
Du et al.

(10) Patent No.: US 8,458,497 B2
(45) Date of Patent: Jun. 4, 2013

(54) DEMAND BASED POWER CONTROL IN A GRAPHICS PROCESSING UNIT

(75) Inventors: Yun Du, San Diego, CA (US); Chun Yu, San Diego, CA (US); Guofang Jiao, San Diego, CA (US); Stephen Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 945 days.

(21) Appl. No.: 11/870,597

(22) Filed: Oct. 11, 2007

(65) Prior Publication Data

US 2009/0096797 A1   Apr. 16, 2009

(51) Int. Cl.
| G06F 1/00 | (2006.01) |
| G06F 1/26 | (2006.01) |
| G06F 1/32 | (2006.01) |
| G06T 1/20 | (2006.01) |

(52) U.S. Cl.
USPC ........... 713/320; 713/300; 713/322; 713/323; 345/506

(58) Field of Classification Search
USPC ................... 713/320, 322, 323, 300; 345/506
See application file for complete search history.

(56) References Cited

U.S. PATENT DOCUMENTS

| 5,367,638 | A  | * | 11/1994 | Niessen et al. .................. 710/57 |
| 6,345,362 | B1 |   | 2/2002  | Bertin et al. |
| 6,647,502 | B1 | * | 11/2003 | Ohmori ......................... 713/322 |
| 6,820,209 | B1 |   | 11/2004 | Culbert et al. |
| 6,865,653 | B2 | * | 3/2005  | Zaccarin et al. .............. 711/154 |
| 7,134,028 | B2 |   | 11/2006 | Bose et al. |
| 7,281,140 | B2 |   | 10/2007 | Burns et al. |
| 7,401,242 | B2 |   | 7/2008  | Abernathy et al. |
| 7,437,582 | B1 | * | 10/2008 | Parlour ......................... 713/320 |
| 7,500,123 | B2 | * | 3/2009  | Luong et al. .................. 713/322 |
| 2005/0066213 | A1 | * | 3/2005  | Vorbach et al. .............. 713/500 |
| 2006/0059377 | A1 | * | 3/2006  | Sherburne, Jr. .............. 713/300 |
| 2006/0259804 | A1 | * | 11/2006 | Fry ............................... 713/324 |
| 2007/0074011 | A1 | * | 3/2007  | Borkar et al. ................. 712/227 |
| 2009/0049312 | A1 | * | 2/2009  | Min .............................. 713/300 |

FOREIGN PATENT DOCUMENTS

| JP | 2001100857 A | 4/2001 |
| JP | 2003233434 A | 8/2003 |
| JP | 2003256065 A | 9/2003 |
| WO | WO 2007089014 A1 | 8/2007 |

OTHER PUBLICATIONS

European Search Report—EP08006436, Search Authority—Munich Patent Office, Oct. 29, 2008.
International Search Report and Written Opinion—PCT/US2008/079644, International Search Authority—European Patent Office—Nov. 9, 2009.
Taiwan Search Report—TW097139013—TIPO—Mar. 21, 2012.

* cited by examiner

Primary Examiner — Kim Huynh
Assistant Examiner — Brandon Kinsey
(74) Attorney, Agent, or Firm — Matthew J. Evans; James R. Gambale, Jr.

(57) ABSTRACT

Disclosed herein is power controller for use with a graphics processing unit. The power controller monitors, manages and controls power supplied to components of a pipeline of the graphics processing unit. The power controller determining whether and to what extent power is to be supplied to a pipeline component based on status information received by the power controller in connection with the pipeline component. The power controller is capable of identifying a trend using the received status information, and determining whether and to what extent power is to be supplied to a pipeline component based on the identified trend.

25 Claims, 6 Drawing Sheets

DEMAND BASED POWER CONTROL IN A GRAPHICS PROCESSING UNIT

TECHNICAL FIELD

This disclosure relates to graphics processing units and, more particularly to monitoring and controlling power consumption in a graphics processing unit.

BACKGROUND DISCUSSION

A graphics processing unit (GPU) is a dedicated graphics rendering device used to generate computerized graphics for display on a display device. GPUs are built with a highly-parallel structure that provides more efficient processing than typical, general purpose central processing units (CPUs) for a range of complex algorithms. For example, the complex algorithms may correspond to representations of three-dimensional computerized graphics. In such a case, a GPU can implement a number of primitive graphics operations to create three-dimensional images for display on a display device more quickly than using a CPU to draw the image for display on the display device.

A typical GPU receives an image geometry and uses a pipeline approach to generate graphics which can be output, for example, for display on a display device. A typical graphics pipeline includes a number of stages which operate in parallel, with the output from one stage being used at another stage in the pipeline. Each stage in the pipeline is performed by one or more components. Workloads for each component can vary based on the data to be operated on by the component and the number of operations to be performed on the data, for example. In addition, workloads can vary from one image geometry to the next, and at different times during the processing of one image geometry.

Figure 1:
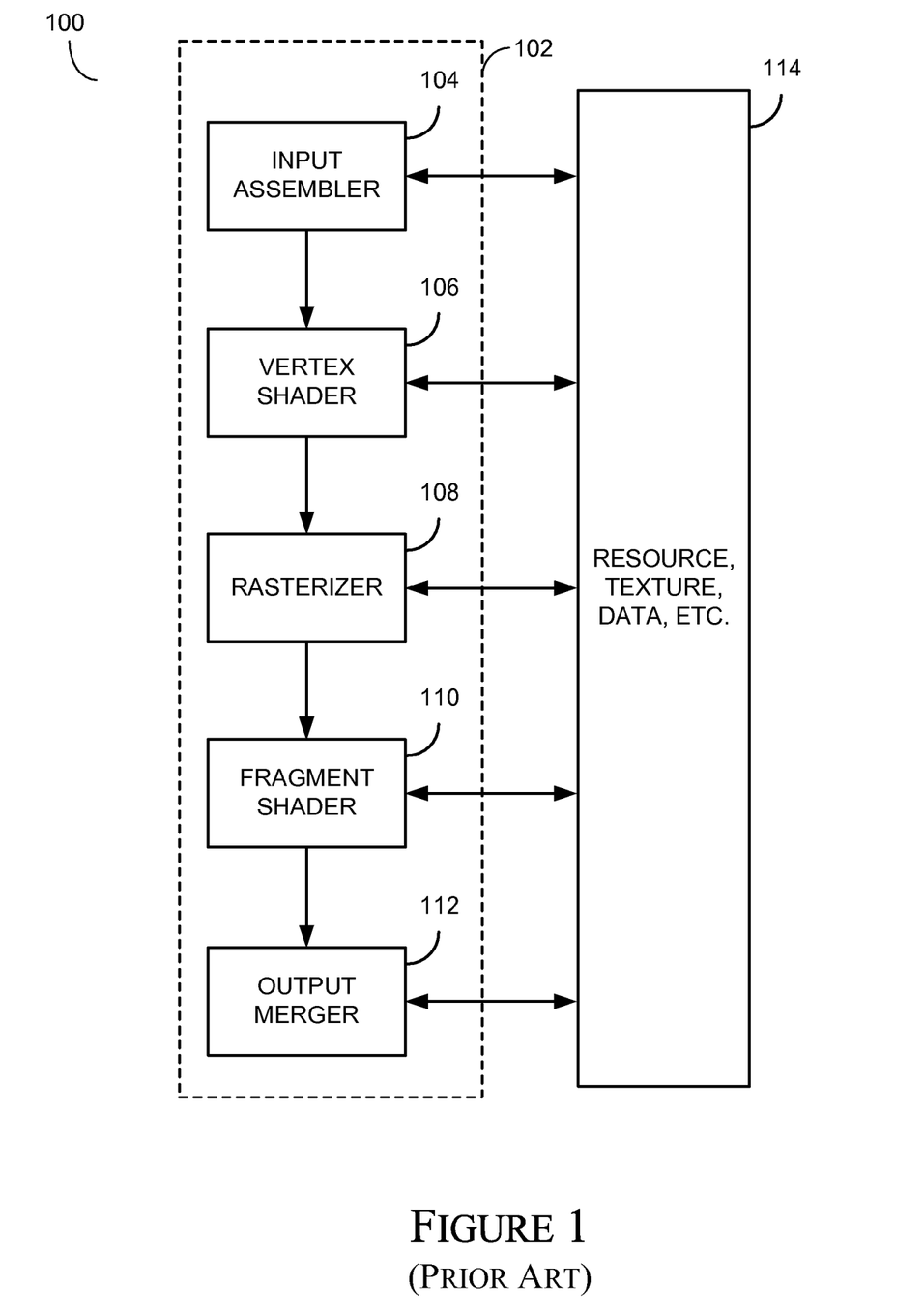
FIG. 1 illustrates components of a conventional GPU system with a pipeline for processing an image geometry.

FIG. 1 illustrates components of a conventional GPU system using a pipeline for processing an image geometry. The graphics pipeline 102 of GPU system 100 consists of an input assembler 104, vertex shader 106, rasterizer 108, fragment shader 110 and output merger 112, each of which has access to resources 114. Resources 114 are the data resources used by the graphics pipeline 102, such as the coordinates and attributes associated with each vertex identified in the image geometry. Vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. Vertex attributes, for example, may include color, normal, and texture coordinates associated with a vertex. Resources 114 can also include other data, such as textures, used by graphics pipeline 102.

The input assembler 104 assembles vertices of primitives that are to be processed via the graphics pipeline 102. Vertex shader 106 is applied to the image geometry for an image and generates vertex coordinates and attributes of vertices within the image geometry. Rasterization 108 converts primitives into pixels based on the XY coordinates of vertices within the primitives and the number of pixels included in the primitives. Fragment shader 110 renders the pixels, which are output to the output merger 112 for post-processing and presentation of the processed image using an output device.

One component of graphics pipeline 102 (e.g., rasterizer 108) can be idle (e.g., having completed processing on a given batch of data or waiting for some reason to process remaining data). While the one component is idle, it is still receiving the same level of power as another component that is actually operating at full capacity to process the data. While power consumption can be of concern regardless of the source of power, it is of particular concern in a case that the source has a limited power capacity, such as in the case of a battery that has a limited charge.

SUMMARY

The present disclosure seeks to address failings in the art and to provide efficiencies in graphics image processing by controlling power consumption based on a determined demand for power by components processing graphics data.

Disclosed herein is power controller for use with a graphics processing unit. The power controller monitoring, managing and controlling power supplied to components of a pipeline of the graphics processing unit. The power controller determining whether and to what extent power is to be supplied to a pipeline component based on status information received by the power controller in connection with the pipeline component. The power controller is capable of identifying a trend using the received status information, and determining whether and to what extent power is to be supplied to a pipeline component based on the identified trend.

Graphics pipeline components of a graphics processing unit can be monitored to determine whether and to what extent a component needs power, and a level of power can be supplied to the component based on the determination, independent of a level of power supplied to another component. In accordance with one or more embodiments, status information identifying an operating state is analyzed, including status information associated with a buffer associated with the component. By way of non-limiting examples, status information, such as the amount data stored in an associated buffer and/or a processing state of the component, is monitored to identify a level of power to be supplied to the component, and a frequency of a clock signal input to the component.

By virtue of this arrangement and by way of a non-limiting example, efficiencies in processing an image geometry can be achieved, at least with respect to controlling power consumed. A capability is provided to identify an opportunity to reduce or completely shut down power to a pipeline component, and to make an adjustment in power supplied to one pipeline component independent of the power supplied to other pipeline components. Thus and by way of a further non-limiting example, a component that does not need power to operate, for at least a period of time, can be identified and power can be shut off to the component without impacting other components in the pipeline. As a result, the amount of power consumed by the graphics processing unit can be controlled, and power consumption can be limited to the amount of power needed by the pipeline to process the image geometry.

In at least one embodiment, a method is described for use with a graphics processing unit. For at last one component of a pipeline of the graphics processing unit, status information identifying an operating state corresponding to the at least one component is monitored, and a level of power is supplied to the at least one component based on the monitored operating state.

In accordance with one or more embodiments, an apparatus is described in which a graphics processing unit is configured to execute a graphics processing pipeline to process an image geometry for an image, the graphics processing pipeline comprising at least one component. A power controller is configured to monitor status information identifying an operating state corresponding to the at least one component, and supplying a level of power to the at least one component based on the monitored operating state.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 5, which comprises FIGS. 5A and 5B, provides an example of a process flow for use by a power controller of a graphics processing unit in accordance with embodiments of the present disclosure.

DETAILED DESCRIPTION

Certain embodiments of the present disclosure will now be discussed with reference to the aforementioned figures, wherein like reference numerals refer to like components.

In accordance with one or more embodiments, a method and apparatus are disclosed, in which power is monitored, managed and controlled by a power controller, which controls a level of power supplied to components of a graphics processing unit's pipeline based on status information identifying an operating state of each component whose power supply is being managed. Status information can comprise, without limitation, data buffering trends, buffered data amounts, a stalled status of a component.

Figure 2:
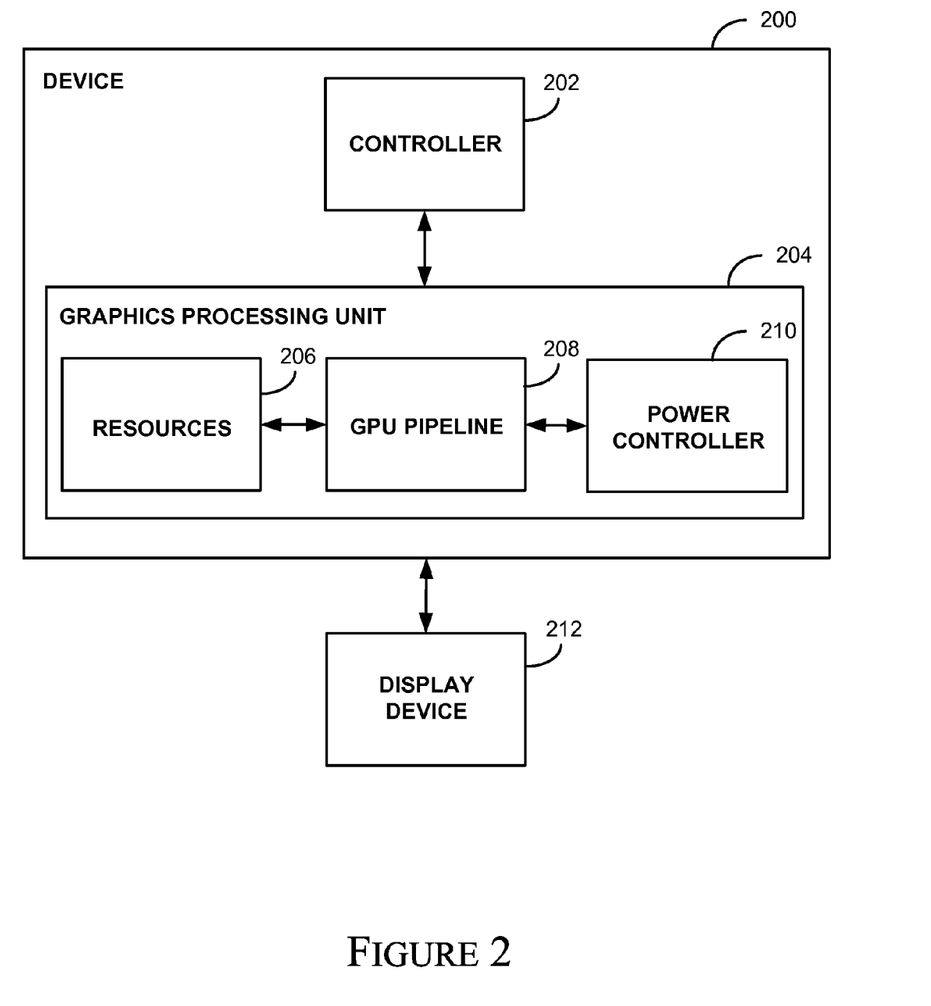
FIG. 2 is a block diagram illustrating an exemplary device including a graphics processing unit that implements techniques for processing computerized images using a power controller in accordance with one or more embodiments of the present disclosure.

FIG. 2 is a block diagram illustrating an exemplary device 200 including a graphics processing unit (GPU) 204 that implements techniques for controlling and managing power usage in a GPU pipeline in accordance with one or more embodiments of the present disclosure. In the example of FIG. 2, device 200 includes a controller 202 capable of controlling operation of GPU 204. Controller 202 may also be capable of controlling operation of device 200. In accordance with the techniques described herein, GPU 204 includes a GPU pipeline 208 and resources 206 coupled to GPU pipeline 208. In addition, GPU includes a power controller 210, which is configured to monitor, manage and control power used by components of the GPU pipeline 208.

GPU 204 receives an image geometry for an image from controller 202 within device 200. The image geometry may correspond to representations of complex, two-dimensional or three-dimensional computerized graphics. GPU 204 processes the image geometry to present image effects, background images, or video gaming images, for example, to a user of device 200 via a display device 212. The images may be formed as video frames in a sequence of video frames. Display device 212 may comprise a liquid crystal display (LCD), a cathode ray tube (CRT) display, a plasma display, or other type of display, or other output, device integrated with or coupled to device 200, by way of non-limiting examples.

By way of a non-limiting example, in some cases, controller 202 receives the image geometry from applications operating within device 200. For example, device 200 can comprise a computing device operating a video gaming application based on image geometry received from an internal hard drive or a removable data storage device. In other exemplary cases, controller 202 can receive the image geometry from applications operating external to device 200. For example, device 200 can comprise a computing device operating a video gaming application based on image geometry received from an external server via a wired or wireless network, such as the Internet. The image geometry might be received via streaming media or broadcast media, via a wired connection, wireless connection or a combination of both.

When a user of device 200 triggers an image effect, selects a background image, or initiates a video game, for example, controller 202 receives the corresponding image geometry from an application and sends the image geometry to GPU 204. GPU 204 processes the image geometry to prepare the corresponding image for presentation on display device 212. For example, GPU 204 can implement a number of primitive graphics operations, including operations to form one or more primitives (e.g., point, line, triangle, shape, polygon, etc.), to create an image represented by the received image geometry for output to an output device, such as display device 212, for example.

According to the techniques described herein, GPU pipeline 208 receives the image geometry from, and can store resources to, resources 206. As is discussed in more detail below, GPU pipeline 208 uses a number of buffers to pass data, e.g., vertex values, from one pipeline processing stage, or component, to another.

In accordance with one or more embodiments, vertex values comprise vertex coordinates and vertex attributes. Vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. Vertex attributes, for example, may include color, normal, and texture coordinates associated with a vertex.

In the embodiment illustrated in FIG. 2, display device 212 comprises a separate device from device 200. Display device 212 can be coupled to device 200 via a wireless connection, a wired connection, or some combination of both. For example, device 200 can comprise a server or other computing device, e.g., a server or computing device of a communication service provider, and display device 212 can be included within a device, e.g., a mobile device, connected to the server or other computing device. In such an exemplary case, by way of non-limiting examples, display device 212 can comprise a display within a mobile radiotelephone, a satellite radiotelephone, a portable computer with a network communication card (e.g., wireless, wired, or combination of both), a personal digital assistant (PDA) equipped with a network communication capability, or any of a variety of devices capable of communicating with the service provider's computing devices, or other devices connected to the service provider's computing devices.

In accordance with other embodiments disclosed, display device 212 can be integrated within device 200. By way of a non-limiting example, device 200 can comprise a mobile, and/or a handheld, device and display device 212 can comprise an integrated display of device 200. By way of another non-limiting example, device 200 can comprise a desktop or notebook computer, and display device 212 can comprise a dedicated monitor or display of device 200. By way of yet another non-limiting example, device 200 can also comprise a wired communication device or a device not principally directed to communication, and display device 200 can comprise a display within the device. For example, device 200 can comprise a PDA or handheld video game device that includes display device 212. Hence, in accordance with various embodiments, video imagery for display on display device 212 can be obtained from a device that is local or remote to display device 212.

Figure 3:
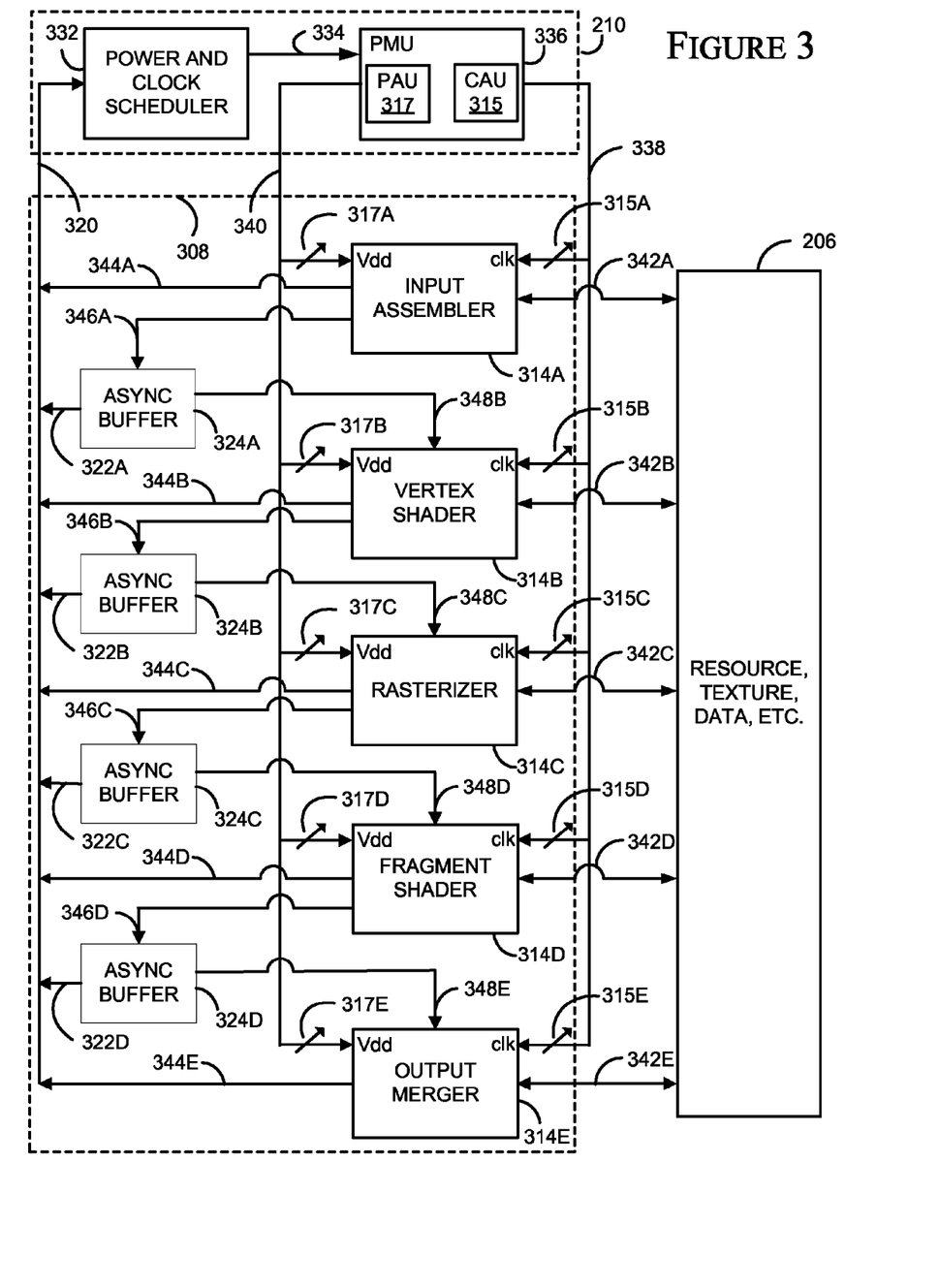
FIG. 3 provides an example of a block diagram illustrating a graphics processing unit pipeline within a graphics processing unit which uses a power controller to monitor, manage and control power in accordance with one or more embodiments of the present disclosure.

FIG. 3 provides an example of a block diagram illustrating a GPU pipeline 308 within a GPU, e.g., GPU 204, which uses power controller 210 to monitor, manage and control power used by GPU pipeline 308 in accordance with one or more embodiments of the present disclosure. GPU 204 can be included within a device substantially similar to device 200 from FIG. 3, for example. GPU pipeline 308 can include any number or type of components to implement the various stages of a GPU pipeline. By way of a non-limiting example, GPU pipeline 308 of FIG. 3 includes input assembler 314A, vertex shader 314B, rasterizer 314C, fragment shader 314D and output merger 314E. The input assembler 314A assembles vertices of primitives that are to be processed via the graphics pipeline 102. Vertex shader 314B is applied to the image geometry for an image and generates vertex coordinates and attributes of vertices within the image geometry. Rasterization 314C converts primitives into pixels based on the XY coordinates of vertices within the primitives and the number of pixels included in the primitives. Fragment shader 314D renders the pixels, which are output to the output merger 314E for post-processing and presentation of the processed image using an output device.

An image geometry and rendering commands for an image are received by GPU 204 from a controller (e.g., controller 202) of the device (e.g., device 200) in which GPU 204 resides. The image geometry can correspond to representations of complex, two-dimensional or three-dimensional computerized graphics, for example. The image geometry and rendering commands can be passed along GPU pipeline 308 to various processing stages of the GPU pipeline 302.

Power controller 210 is configured to adjust power and clock input signals to each of the components of pipeline 308 independent of the other components based on status information collected for the component. In the example shown in FIG. 3, input assembler 314A, vertex shader 314B, rasterizer 314C, fragment shader 314D and output merger 314E are each capable of receiving power and clock input independent of the other components. By virtue of this arrangement and by way of a non-limiting example, power controller 210 can manage power consumed by the GPU 204, and in particular pipeline 308, based on feedback received from the pipeline 308. By way of a further non-limiting example, power controller 210 can change (increase or decrease) the power and/or clock frequency to one or more components of the pipeline 308, while leaving the power and/or clock frequency for the other components of the pipeline 308 unchanged. Power controller can be separate from, or alternatively implemented by, controller 202, for example.

In accordance with one or more embodiments, power controller 210 comprises a power and clock scheduler (PCS) 332 and power management unit (PMU) 336. Although shown as separate components in the example of FIG. 3, it should be apparent that PCS 332 and PMU 336 can be an integrated unit, or can be made up of more than the two components shown. PMU 336 is configured to supply power via power supply line 340 to each of the components 314A to 314E, and to set a clock frequency for each of the components 314A to 314E, via clock signal line 338. Power and clock input can be adjusted, respectively, by power adjustment unit (PAU) 317, also referred to herein as power adjuster 317, and by clock adjustment unit (CAU) 315, also referred to herein as clock adjuster 315. In the example of FIG. 3, PAU 317 and CAU 315 are shown to be a part of PMU 336. However, it should be apparent that PAU 317 and CAU 315 can be separate from PMU 336. Although shown as a single line, in accordance with one or more embodiments, power supply line 340 (or clock signal line 338) can comprise separate lines, one for each of components 314A to 314E.

In accordance with one or more embodiments, power is supplied to components 314A to 314E via power supply line 340 and adjusters 317A to 317E, respectively. By way of a further non-limiting example, PAU 317 can use adjuster 317A to adjust the voltage supplied to input assembler 314A independent of the voltage supplied to any of the remaining components 314B to 314E. Similarly, clock signal input supplied via clock signal line 338 can be adjusted by CAU 315, under the control of PMU 336, for each component 314A to 314E independent of the other via adjusters 315A to 315E, respectively. By way of yet another non-limiting example, the clock signal input is a function, e.g., a linear function, of the power supplied to a component 314, such that the level of power supplied to the component 314 results in a clock signal and a resulting clock frequency, for the component 314. The clock frequency specifies the cycles per second at which component 314 operates to process data. The clock frequency, and clock signal input, for a given component 314 can be independent of the clock frequency, and clock signal input, associated with the other components 314. Adjuster 315A can be used by PMU 336 and CAU 315 to adjust the clock frequency, and clock signal input, at which input assembler 314A, for example, operates independent of the clock frequency, and clock signal input, associated with the other components 314B to 314E.

PMU 336 is configured to control CAU 315, PAU 317, adjusters 315A to 315E and 317A to 317E, power supply line 340 and clock signal line 338 based on control input received from PCS 332. PCS 332 monitors state, or status, information collected via status line 320, for example, for each of components 314A to 314E in order to make a determination as to what if any adjustments are to be made to the power and clock inputs for each of components 314A to 314E. PCS 332 forwards control information to PMU 336 based on determinations made using the collected status information. Status information can include, but is not limited to, data buffering amounts and trends, a processing state of the component, and a processing state of the pipeline 308.

In accordance with one or more embodiments, for example, data output by one component is passed to another component using a buffer. In accordance with one or more embodiments, an asynchronous buffer is used, such that the buffer can potentially operate at different clock speed, or frequency, to write data to the buffer than the clock speed at which data is read from the buffer. In accordance with one or more embodiments, the buffer is a First In, First Out (FIFO) buffer. In accordance with at least one embodiment, a component writes data to an asynchronous FIFO buffer for operation by another component in the pipeline 308. In addition, the asynchronous FIFO buffer provides feedback, in the form of status information for example, as to the amount of the buffer being used to store data.

By way of a non-limiting example, input assembler 314A outputs vertex values, e.g., coordinates and/or attributes, for vertices identified by the image geometry to asynchronous buffer 324A via a write operation and line 346A. Input assembler 314A is operating at a clock speed set by PMU 336 via clock signal line 338 and adjuster 315A, and receiving power via power line 340 and adjuster 317A. Input assembler 314A can access, e.g., retrieve and/or store, resources in resources 206 via line 342A. Vertex shader 314B is operating at a power level supplied via power 340 and adjuster 317B and clock speed based on clock input received via clock signal line 338 and adjuster 315B, which can be the same or different than the power supplied and clock signal input to input assembler 314A, as set by power controller 210. Vertex shader 314B fetches from buffer 324A data written to buffer 324A by input assembler 314A using a read operation and line 348B, and can access resources in resources 206 via line 342B. As discussed above, buffer 324A is capable of accommodating different clock speeds for the read and write operations.

Buffer 324A provides feedback, via status lines 322 and 320, e.g., in the form of buffer usage to power controller 210 periodically. The frequency at which the information is provided to power controller 210 can be predetermined, e.g., at a given time interval at which power controller 210 is to operate on the status information collected, such as every ten miniseconds. Alternatively, power controller 210 can collect and operate on the status information on a more or less frequent basis. The period by which power controller 210 collects status information can be dynamically determined, e.g., based on the current buffer depth (e.g., the amount of the buffer used/free), rate at which the buffer depth changes, operation of the components using the buffer, etc. In accordance with one or more embodiments, the feedback can be provided with each read or write operation.

In accordance with disclosed embodiments, input assembler 314A, and/or any one or more of components 314B to 314E, can provide status information to PCS 332 via status line 320 and status output signal line 344A to 344E. For example, a component such as input assembler 314A can identify a state in which the component 314 has completed processing the data for a given batch of data received by GPU 204, e.g., an idle state. By way of a further non-limiting example, input assembler 314A can identify a wait, or stalled, state, in which the component is waiting for some reason (e.g., waiting for a resource from resource 206) to process remaining data.

In accordance with one or more embodiments, PCS 332 uses received status information to identify a trend, e.g., increasing usage of a buffer 324 by a component 314. As is discussed in more detail below, trends can be used in combination with available buffer depth to determine whether or not a change in power supplied and/or clock signal input is to be made. Alternatively, an identified trend can be used independent of other status information, e.g., information regarding available buffer depth, to make a determination regarding power and clock speed.

As with vertex shader 314B and continuing along the pipeline shown in the example shown in FIG. 3, any of the components remaining in the pipeline, e.g., 314C to 314E can process data fetched from a buffer 324, e.g., buffers 324B to 324D, and operate on the fetched data based on the power supply and clock signal input from, respectively power supply line 340 and clock signal line 338. The power supplied and clock signal input being adjusted by PMU 336 via adjusters 317C to 317E and 315C to 315E corresponding to components 314C to 314E.

In contrast to traditional approaches used with GPU pipeline in which a same voltage and clock frequency are used for all of the pipeline components regardless of the work load being processed by each of the pipeline components and/or any differences in work load across the pipeline components, embodiments of the present disclosure provide a capability to adjust the supplied power and clock signal input for each pipeline component independent of another pipeline component, based on a component's 314 work load as determined by power controller 210 using status information received by PCS 332. Adjustment(s) can be made based on status information fed back to the PCS 332 from one or more buffers, 324, used by pipeline components 314 and or from the components themselves. Furthermore, and although not shown in FIG. 3, input can also be received from any component internal to the GPU 204, e.g., resources 206, or external to GPU 204, device 200 or display device 212.

By way of a non-limiting example, rather than supplying constant power, e.g., a consistent voltage level, such as 1.2 volts, embodiments of the present disclosure can vary the voltage within one or more ranges, e.g., each having a minimum and a maximum voltage level. In accordance with one or more embodiments, power supplied can vary from 0.0 volts to 1.2 volts. In a case, for example, that power controller 210 determines that a component 314 of pipeline 338 has completed processing a current batch of image data, e.g., GPU 204 is awaiting image geometry from controller 202, PCS 332 can instruct PMU via signal line 334 to reduce or discontinue power supply to the identified component 314. Alternatively and if the power controller 210 determines that a component 314 is in a stalled state, but needs to maintain some level of power, e.g., to retain a global and/or local variable (or state) for further processing, PCS 332 can instruct PMU 336 to reduce the power supplied, without completely turning power off to the component 314. By way of a further non-limiting example and in accordance with one or more embodiments disclosed, a voltage level of 0.9 volts can be supplied to such a component 314, so that the component can retain an operating state while in a stalled state. By way of yet another non-limiting example, a voltage level of 1.2 volts can be supplied to a component 314 to operate at full capacity. Of course, it should be apparent that any voltage levels, and or voltage range, can be used with embodiments of the present disclosure. In addition and in accordance with disclosed embodiments, additional power supply levels can be used between the "stalled" and "full-capacity" voltage levels, so that a component 314 can operate at a level somewhere between the stalled and full-capacity power levels. A voltage level between the stalled and full-capacity state voltage levels can be determined based on the collected status information, for example. In accordance with disclosed embodiments, clock frequency or speed is a function of the voltage supplied, such that clock speed, which dictates a speed at which a component 314 operates is increased, e.g., linearly, as the voltage supplied to the component is increased.

By operating at a full capacity while the component 314 is not waiting for a resource and has buffered data to be processed, a component 314 is more likely, e.g., than if it were operating at a lesser capacity, to be able to complete its processing of the buffered data, thereby increasing the likelihood that the component 314 can enter an idle state, at which point power and clock input can be shut off for the component 314. While the component 314 is in the idle state, power that would otherwise have been used by the component 314 can be conserved, e.g., minimize power supplied and leakage. In a case that the component 314 must wait for some reason before processing buffered data, minimal operational power and clock signal input can be supplied to the component 314, thereby dynamically reducing power usage.

In accordance with embodiments disclosed, PCS 332 can be used for task loading by controlling the power and clock inputs to the components 314 of the pipeline 308. By way of a non-limiting example, PCS 332 can use collected status information to provide power to a particular component 314 of pipeline 308 so that the component can operate at a full capacity to perform the tasks associated with the component. In addition, PCS 332 can reduce power supplied to one or more other components 314 of pipeline 308, so that these other components 314 are placed in a wait state for some period of time. In effect, PCS 332 can reduce the power supplied to one or more components 314 to compensate for the increased power supplied to the one or more components 314. Power controller 210 can further be used to accumulate data in a buffer and then act as a scheduler to schedule a component 314 to process the buffered data.

In accordance with one or more embodiments, power controller 210 can set an initial power supply level that is the same for all of the components 314, or alternatively, power controller 210 can supply power to a first set of one or more components 314 positioned at the initial processing stage(s) of pipeline 338 to operate the first set at a full capacity, or some level below full capacity. The power controller 210 can delay supplying power to a second set comprising others of component(s) 314 of pipeline 338 until data is buffered for processing by the second set of components. PCS 332 can monitor the buffer(s) 324 to which the first component set write data to determine when and to what extent to increase the power supplied to the second component set that are to read the data from the buffers 324. A component in either the first set or a component in the second set that is receiving some power can provide status information to power controller.

Figure 4:
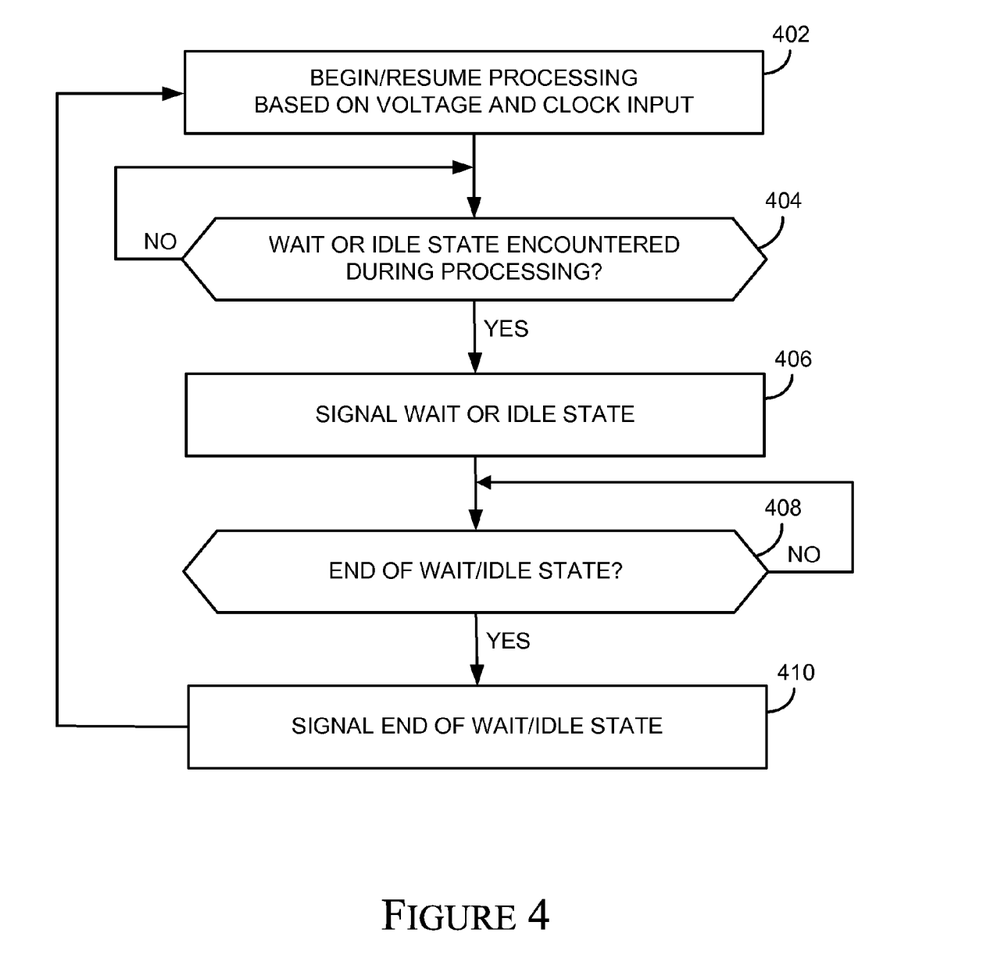
FIG. 4 provides an example of a process flow for use by a component of a graphics processing unit pipeline providing status information to a power controller of the graphics processing unit in accordance with one or more embodiments of the present disclosure.

FIG. 4 provides an example of a process flow for use by a component of a graphics processing unit pipeline providing status information to a power manager of the graphics processing unit in accordance with one or more embodiments of the present disclosure. In accordance with the example shown in FIG. 4, a component 314 provides status information with regard to a wait state, e.g., awaiting some resource to continue processing data buffered for processing by the component, or idle state, e.g., the component 314 has completed processing the data for a given batch of image data. It should be apparent that other status information supplied by a component 314 can be used with one or more embodiments of the present disclosure.

At step 402 of FIG. 4, the component 314 begins processing, or in a case that the component 314 was in a stalled or idle state resume processing. At step 404, the component 314 determines whether or not a wait or idle state has been encountered. If not, processing continues. If a wait or idle state has been encountered by the component 314, processing continues at step 406 to notify power controller 210. Component 314 awaits a change in state at step 408, and at step 410 notifies power controller 210 of a change in state.

A change in state can occur, for example, when component 314 receives power supplied via PMU 336 to remove it from an idle state, or the condition which caused the component 314 to enter the wait state changes, e.g., the resource is received from resources 206. Component 314 resumes processing at step 402.

Figure 5A:
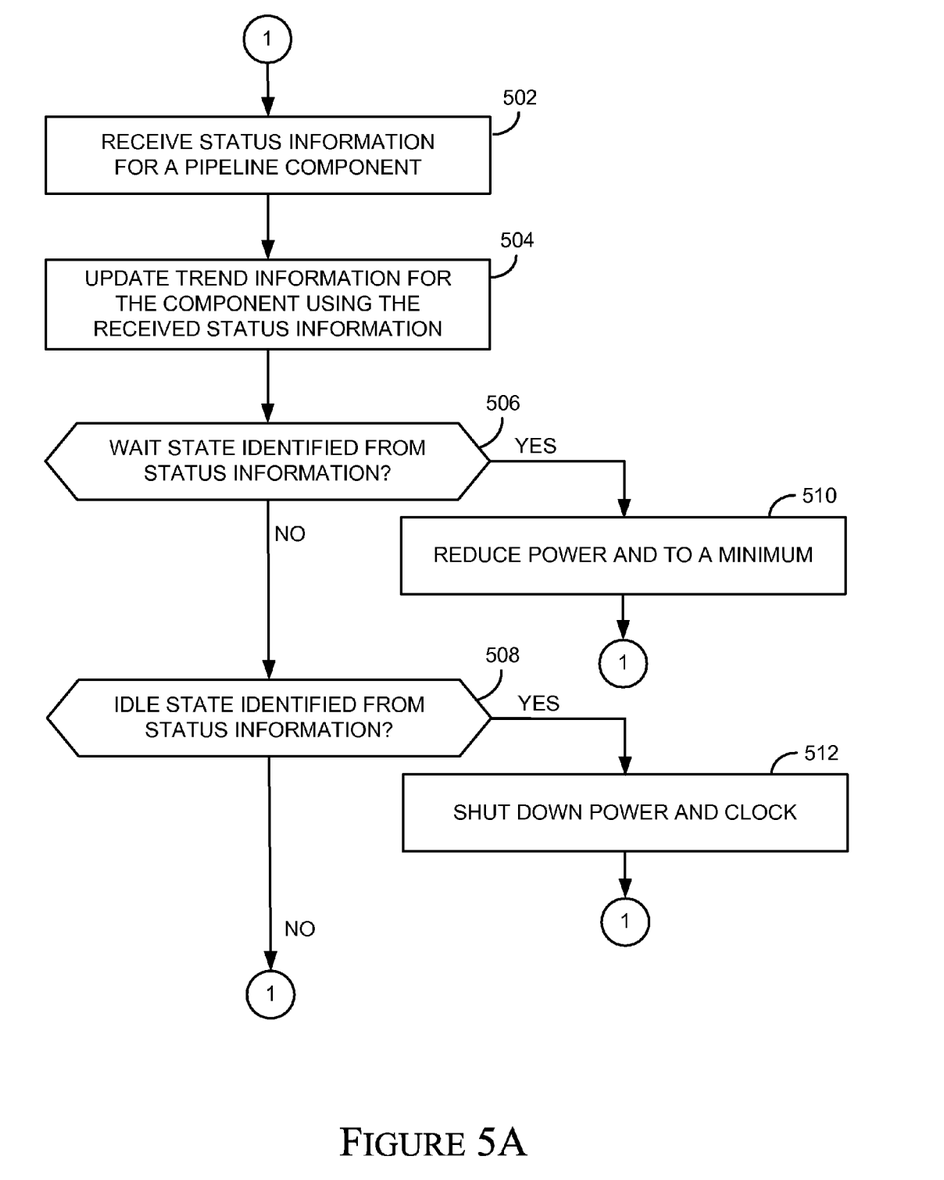
Figure 5B:
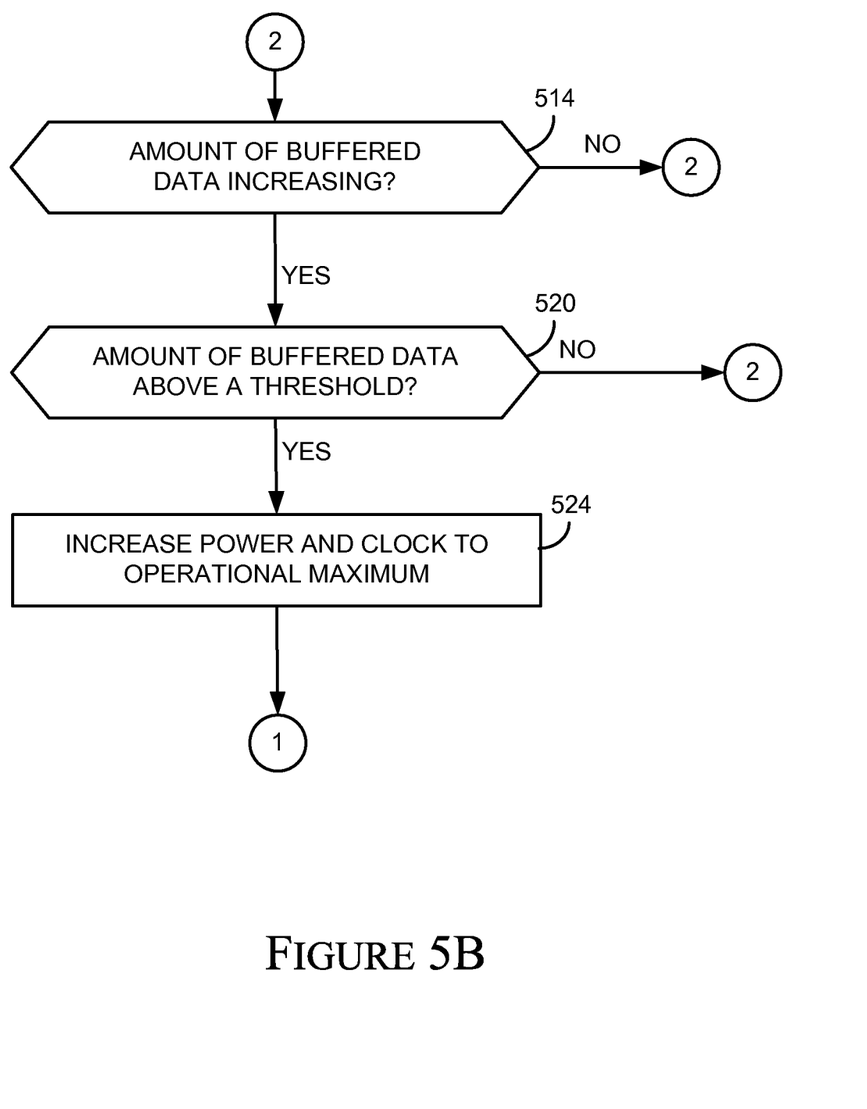

FIG. 5, which comprises FIGS. 5A and 5B, provides an example of a process flow for use by a power manager of a graphics processing unit in accordance with embodiments of the present disclosure. In general, the process flow shown in the example of FIG. 5 can be performed by power controller 210 for each of the components 314 of pipeline 308. The power controller 210 receives status information from/about the component 314, updates trend information retained by power controller 210 for the component 314 using the received status information, and makes adjustments to the power and clock signal inputs for the component 314 based on the received status information and or trend information.

Referring to FIG. 5A, at step 502, status information is received by power controller 210 from, or in connection with, the component 314. For example and as discussed herein, the status information can include whether or not the operational state of the component 314 has changed, such as in a case that the component 314 has entered an idle or wait state. In addition and by way of a further non-limiting example, the status information received can include information received from a buffer 324, from which component 314 reads data, or to which component 314 writes data. The latter information might be used in connection with the current component 314, or another component 314, currently being examined by power controller 210.

At step 504, power controller 210 updates trend information for the component 314 using status information received in step 502. The trend information can indicate, for example, whether an amount of available storage of buffer 324, to which component 314 writes data, or from which component 314 reads data, is increasing or decreasing. The trend information can be determined based on a comparison of the current information and previously-received information. The previously-received information can comprise information received just prior to the current information, or it can comprise information received from multiple transmissions, for example.

A determination is made at step 506, whether or not a wait state is indicated from the received status information. If so, power controller 210 can cause power supply and clock input to be reduced to the component 314 to a minimum amount. By way of a non-limiting example, PCS 332 can instruct PMU to 338 to adjust 317 the power fed to the component 314 via power supply line 340 and to adjust 315 the clock signal fed to component 314 via clock signal line 338. The power controller 210 continues processing with respect to this component 314 at step 502 to await receipt of additional status information in connection with the component 314.

In a case that power controller 506 determines that the component 314 is not in a wait state, processing continues at step 508 to make a determination whether the component 314 has entered an idle state. In a determination is made that the component 314 has entered an idle state, processing continues at step 512 to shut off/down power supply and clock input to the component 314, and processing continues at step 502 to await additional status information in connection with the component 314.

In accordance with embodiments of the present disclosure, a component 314 can be considered to be in an idle state, e.g., there is no data to be processed by the component 314, or the amount of data that is to be processed by the component 314 is below a specified threshold. When a component 314 is in an idle state, embodiments of the present disclosure can monitor the amount of data buffered for the component 314 to determine when to increase the power supply power and clock signal input, e.g., to full capacity, to the idling component 314. In accordance with one or more embodiments of the present disclosure, the amount of buffered data for a component 314 coming out of a wait state can also be used to determine whether to supply full power and clock signal input to the component 314.

With reference to FIG. 5B, power controller 210 examines a trend, e.g., examines the load on a buffer 324 associated with the component 314 over time, such as on a regular intermittent basis for example, to determine whether or not the amount of buffered data appears to be increasing. More particularly, by way of a non-limiting example, a determination is made at step 514, e.g., using trend information, whether there is an increasing amount of buffered data to be processed by the component 314. If not, power controller 210 can continue to watch the trend associated with the component 314. Alternatively, processing can continue at step 520 to ensure that the amount of buffered data does not exceed a determined threshold.

If power controller 210 determines that the amount of buffered data for the component 314 appears to be increasing based on an examination of the trend information, processing continues at step 520 to determine whether the amount of buffered data exceeds a threshold, e.g., a predetermined threshold. If not, the power supply and clock signal inputs for the component 314 are not changed by the power controller 210, and processing continues at step 514 to examine the trend information for the component 314, which can be updated using status information received in connection with the component 314.

If it is determined, at step 514, that the amount of buffered data is increasing and it is determined, at step 520, that the amount of buffered data exceeds a threshold amount, processing continues at step 524, wherein power controller 210 causes the power supply and clock signal inputs to be increased to component 314, e.g., using PMU 336. The amount of the increase can be a predetermined amount, e.g., the power and clock frequency can be increased to full capacity. Alternatively, for example, the increase can be some amount below full capacity identified based on the rate at which the amount of buffered data is increasing and/or the amount of data buffered. Processing can continue at step 514 to examine the trend information for the component 314, which can be updated using status information received in connection with the component 314.

Use of power controller 210 in accordance with embodiments of the present disclosure results in decreased power consumption, at least with respect to an ability to identify an opportunity to reduce or completely shut down power to a pipeline component, and making an adjustment in power supplied to a pipeline component independent of the power supplied to other pipeline components.

Embodiments of the present disclosure can be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

By way of further non-limiting examples, one or more disclosed embodiments can be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method for use with a graphics processing unit comprising:
  for at least one component of a graphics processing pipeline of the graphics processing unit:
    monitoring status information identifying an operating state corresponding to the at least one component;
    determining trend information for the at least one component based on a comparison of current status information and previous status information;
  updating the trend information using the status information;
  supplying a level of power to the at least one component controlled independently of other components of the graphics processing pipeline based on the monitored operating state and the trend information; and
  adjusting a clock signal input to the at least one component controlled independently of the other components based on the monitored operating state and the trend information.

2. The method of claim 1, wherein the status information identifying an operating state corresponding to the at least one component comprises information identifying an amount of data in a buffer associated with the at least one component, and wherein said step of supplying a level of power to the at least one component further comprises:
  increasing the level of power supplied to the at least one component in a case that the amount of data is above a threshold amount.

3. The method of claim 1, wherein the trend information comprises an indication of an amount of data in a buffer associated with the at least one component over time, wherein said step of supplying a level of power to the at least one component further comprises:
  determining a trend using the trend information;
  increasing the level of power supplied to the at least one component at least based on an increasing trend; and
  decreasing the level of power supplied to the at least one component at least based on a decreasing trend.

4. The method of claim 1, wherein the status information identifying an operating state corresponding to the at least one component comprises information identifying a wait state indicating that the at least one component is waiting to process data, the method further comprising:
   in response to an indicated wait state of the at least one component:
      reducing the level of power supplied to the at least one component; and
      turning off a clock signal input to the at least one component.

5. The method of claim 1, wherein the status information identifying an operating state corresponding to the at least one component comprises information identifying an idle state indicating that the at least one component's data processing has reached a completion state, the method further comprising terminating supply of power to the at least one component in response to an indicated idle state of the at least one component.

6. The method of claim 1, wherein the level of power determines a frequency of a clock for processing by the at least one component.

7. The method of claim 1, wherein at an initial processing state of the graphics processing pipeline, the method further comprising delaying an initial level of power supplied to the at least one component until one or more other components of the graphics processing pipeline generate data to be processed by the at least one component.

8. A computer-readable memory medium in which computer-executable program code is stored, the program code for use with a graphics processing unit and comprising code to cause the graphics processing unit to:
   for at least one component of a graphics processing pipeline of the graphics processing unit:
      monitor status information identifying an operating state corresponding to the at least one component;
      determine trend information for the at least one component based on a comparison of current status information and previous status information;
      update the trend information using the status information;
      supply a level of power to the at least one component controlled independently of other components of the graphics processing pipeline based on the monitored operating state and the trend information; and
      adjust a clock signal input to the at least one component controlled independently of the other components based on the monitored operating state and the trend information.

9. The medium of claim 8, wherein the status information identifying an operating state corresponding to the at least one component comprises information identifying an amount of data in a buffer associated with the at least one component, and wherein said code to supply a level of power to the at least one component further comprises code to cause the graphics processing unit to:
   increase the level of power supplied to the at least one component in a case that the amount of data is above a threshold amount.

10. The medium of claim 8, wherein the trend information comprises an indication of an amount of data in a buffer associated with the at least one component over time, the code comprising code to cause the graphics processing unit to supply a level of power to the at least one component further comprises code to cause the graphics processing unit to:
   determine a trend using the trend information;
   increase the level of power supplied to the at least one component at least based on an increasing trend; and
   decrease the level of power supplied to the at least one component at least based on a decreasing trend.

11. The medium of claim 8, wherein the status information identifying an operating state corresponding to the at least one component comprises information identifying a wait state indicating that the at least one component is waiting to process data, the code further comprising code to cause the graphics processing unit to:
   in response to an indicated wait state of the at least one component:
      reduce the level of power supplied to the at least one component; and
      turn off a clock signal input to the at least one component.

12. The medium of claim 8, wherein the status information identifying an operating state corresponding to the at least one component comprises information identifying an idle state indicating that the at least one component's data processing has reached a completion state, the code further comprising code to cause the graphics processing unit to terminate supply of power to the at least one component in response to an indicated idle state of the at least one component.

13. The medium of claim 8, wherein at an initial processing state of the graphics processing pipeline, the code further comprising code to cause the graphics processing unit to delay an initial level of power to be supplied to the at least one component until one or more other components of the graphics processing pipeline generate data to be processed by the at least one component.

14. A graphics processing apparatus comprising:
   a graphics processing unit configured to execute a graphics processing pipeline to process an image geometry for an image, said graphics processing pipeline comprising at least one component; and
   a power controller configured to:
      monitor status information identifying an operating state corresponding to said at least one component;
      determine trend information for said at least one component based on a comparison of current status information and previous status information;
      update the trend information using the status information;
      supply a level of power to said at least one component controlled independently of other components of the graphics processing pipeline based on the monitored operating state and the trend information; and
      adjust a clock signal input to said at least one component controlled independently of the other components based on the monitored operating state and the trend information.

15. The apparatus of claim 14, wherein said graphics processing unit further comprises a buffer associated with said at least one component, wherein the status information identifying an operating state corresponding to said at least one component comprises information identifying an amount of data in said buffer, and wherein said power controller configured to supply a level of power to said at least one component is further configured to:
   increase the level of power supplied to said at least one component in a case that the amount of data is above a threshold amount.

16. The apparatus of claim 14, wherein the trend information comprises an indication of an amount of data in a buffer associated with the at least one component over time, and wherein said power controller configured to supply a level of power to said at least one component is further configured to:
   determine a trend using the trend information;

increase the level of power supplied to said at least one component at least based on an increasing trend; and
decrease the level of power supplied to said at least one component at least based on a decreasing trend.

17. The apparatus of claim 14, wherein the status information identifying an operating state corresponding to said at least one component comprises information identifying a wait state indicating that said at least one component is waiting to process data, said power controller further configured to:
 in response to an indicated wait state of said at least one component:
  reduce the level of power supplied to said at least one component; and
  turn off a clock signal input to said at least one component.

18. The apparatus of claim 14, wherein the status information identifying an operating state corresponding to said at least one component comprises information identifying an idle state indicating that said at least one component's data processing has reached a completion state, said power controller is further configured to terminate supply of power to said at least one component in response to an indicated idle state of said at least one component.

19. The apparatus of claim 14, wherein at an initial processing state of said graphics processing pipeline, said power controller is further configured to delay supplying an initial level of power to said at least one component until one or more other components of said graphics processing pipeline generate data to be processed by said at least one component.

20. An apparatus comprising:
 a graphics processing means for executing a graphics processing pipeline to process an image geometry for an image, said graphics processing pipeline comprising at least one component; and
 a power control means for:
  monitoring status information identifying an operating state corresponding to said at least one component;
  determining trend information for said at least one component based on a comparison of current status information and previous status information;
  updating the trend information using the status information;
  supplying a level of power to said at least one component controlled independently of other components of the graphics processing pipeline based on the monitored operating state and the trend information; and
  adjusting a clock signal input to said at least one component controlled independently of the other components based on the monitored operating state and the trend information.

21. The apparatus of claim 20, wherein said graphics processing means further comprises a buffering means associated with said at least one component, wherein the status information identifying an operating state corresponding to said at least one component comprises information identifying an amount of data in said buffering means, and wherein said power control means for supplying a level of power to said at least one component further comprises:
 means for increasing the level of power supplied to said at least one component in a case that the amount of data is above a threshold amount.

22. The apparatus of claim 20, wherein the trend information comprises an indication of an amount of data in a buffer associated with the at least one component over time, and wherein said power control means for supplying a level of power to said at least one component further comprises:
 means for determining a trend using the trend information;
 means for increasing the level of power supplied to said at least one component at least based on an increasing trend; and
 means for decreasing the level of power supplied to said at least one component at least based on a decreasing trend.

23. The apparatus of claim 20, wherein the status information identifying an operating state corresponding to said at least one component comprises information identifying a wait state indicating that said at least one component is waiting to process data, said power control means further comprising:
 in response to an indicated wait state of said at least one component:
  means for reducing the level of power supplied to said at least one component; and
  means for turning off a clock signal input to said at least one component.

24. The apparatus of claim 20, wherein the status information identifying an operating state corresponding to said at least one component comprises information identifying an idle state indicating that said at least one component's data processing has reached a completion state, said power control means further comprising means for terminating supply of power to said at least one component in response to an indicated idle state of said at least one component.

25. The apparatus of claim 20, wherein at an initial processing state of said graphics processing pipeline, said power control means further comprises means for delaying supply of an initial level of power to said at least one component until one or more other components of said graphics processing pipeline generate data to be processed by said at least one component.

* * * * *